United States Patent [19]

Averdick et al.

[11] Patent Number: 4,854,026
[45] Date of Patent: Aug. 8, 1989

[54] METHOD OF PRODUCING A PRESS PLATEN

[75] Inventors: Günter Averdick; Herbert Sandten, both of Krefeld, Fed. Rep. of Germany

[73] Assignee: G. Siempelkamp GmbH & Co., Krefeld, Fed. Rep. of Germany

[21] Appl. No.: 134,777

[22] PCT Filed: Apr. 7, 1987

[86] PCT No.: PCT/DE87/00153
§ 371 Date: Aug. 19, 1987
§ 102(e) Date: Aug. 19, 1987

[87] PCT Pub. No.: WO87/06167
PCT Pub. Date: Oct. 22, 1987

[30] Foreign Application Priority Data

Apr. 9, 1986 [DE] Fed. Rep. of Germany ....... 3611839

[51] Int. Cl.⁴ ............................................. B23P 15/26
[52] U.S. Cl. ............................ 29/157.3 R; 29/157.4; 29/558; 100/93 P
[58] Field of Search .................. 165/168; 29/557, 558, 29/157.3 R, 157.4; 100/93 P

[56] References Cited

U.S. PATENT DOCUMENTS 1,790,114  1/1931  Southwark ..................... 29/157.3 R
1,929,824  10/1933  Polley ............................ 29/157.3 R
3,176,387  4/1965  Argueso ......................... 273/1.5 A

FOREIGN PATENT DOCUMENTS 1703093  12/1971  Fed. Rep. of Germany .
2558407  7/1985  France .
169992  1/1960  Sweden ............................ 100/93 P Primary Examiner—Robert E. Garrett
Assistant Examiner—Carl D. Price
Attorney, Agent, or Firm—Herbert Dubno

[57] ABSTRACT

Process for making a press platen heatable by a fluid medium whereby in a steel plate a plurality of heating channels running parallel to each other are drilled in one direction and the heating channels are connected according to a predetermined flow pattern for the fluid medium to collecting channels and return channels running transversely with respect to the heating channels. First, the return or collecting channels are drilled. In the return or collecting channels, cores with a predetermined fit are inserted. After that, the heating channels are drilled and thereby the cores inserted in the return or collecting channels are drilled through. Subsequently, the drilled cores are extracted and outside the steel plate the cores of the return channels are provided with deflectingly shaped elements and optionally with plugs. Finally, the cores equipped with the deflecting elements, as well as optionally with plugs, are inserted again in the assigned return channels.

4 Claims, 2 Drawing Sheets

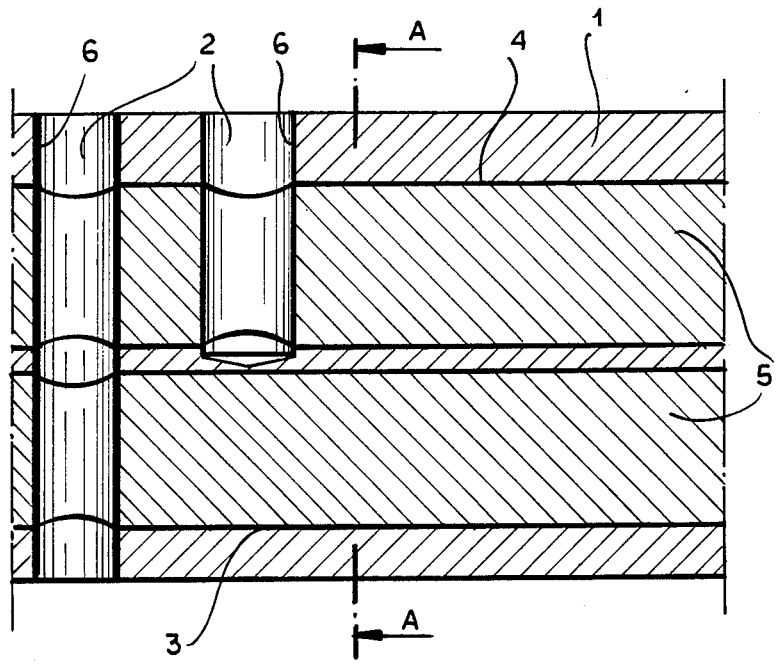
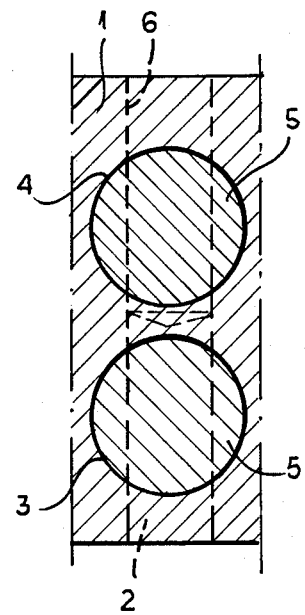
FIG.1  FIG.2
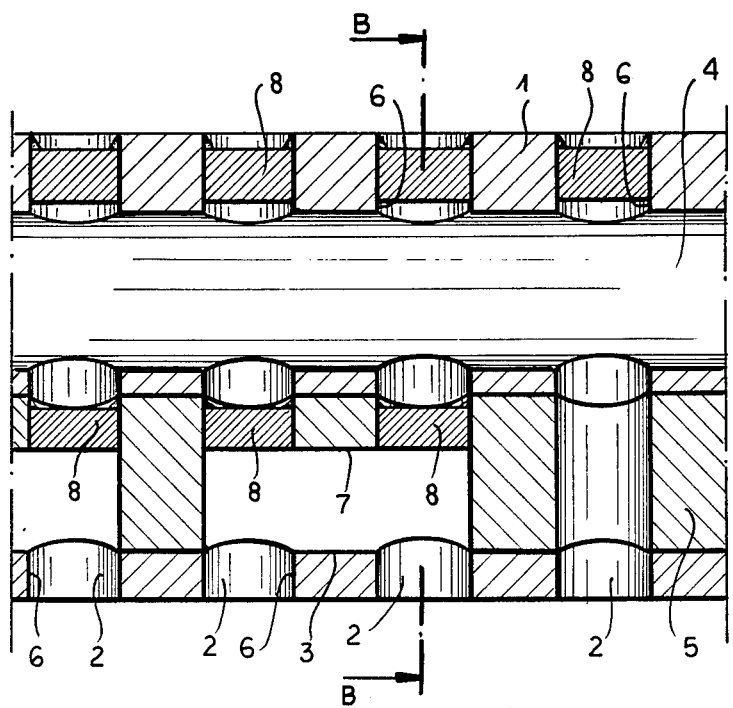
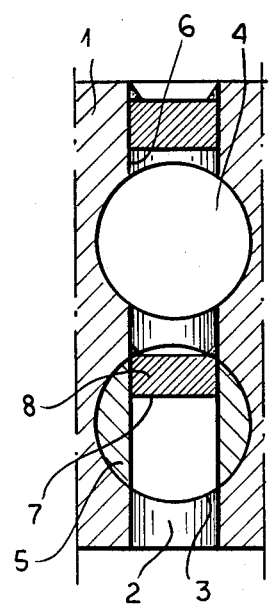
FIG.3  FIG.4

METHOD OF PRODUCING A PRESS PLATEN

CROSS REFERENCE TO RELATED APPLICATIONS

This application is a national phase application coresponding to PCT/DE 87/00153 filed Apr. 7, 1987 and based upon German application No. P 36 11 839.7 filed Apr. 9, 1986 under the International Convention.

FIELD OF THE INVENTION

The present invention relates to a process for the production of a press platen heatable by a fluid medium for platen presses used in making chip board, fiber board, laminated board and the like.

More particularly the invention relates to a method wherein a multitude of heating channels, running parallel to each other, are drilled in one direction in a steel plate and these heating channels are connected to collecting and/or return channels running transversely to the heating channels, according to a predetermined flow pattern for the fluid medium, and wherein deflection elements are inserted in the return channels and plugs are inserted frontally in the heating channels.

BACKGROUND OF THE INVENTION

In platen presses heatable press platens are commonly used. The platen press can be a cycle press or a continuous press. The fluid medium can be for instance steam, water or oil. Depending on the conditions which prevail during the production of chip board, fiber board, laminated board and the like, the fluid medium can also cause cooling.

Collecting channels define those channels which supply the fluid medium to the heating channels or evacuate the fluid medium therefrom.

The return channels define those connecting a plurality of heating channels, for instance in a meander-like manner, with the aid of inserted deflecting elements. In practice a great variety of flow patterns can be created. Sometimes, depending on the thickness of the platen, the channels are arranged on several levels.

In the generically known process as currently practiced, the heating channels are drilled first, and after the return channels or the collecting channels are traced, for instance by arranging particular components, the deflection elements are also inserted and are set against the steel platen. This is cumbersome.

However, it is also known to make bores in the steel plates already provided with heating channels, which will constitute the return or collecting channels. This creates difficulties, because the drills for the collecting channels or return channels are easily destroyed and/or deflected, as a result of their passage through the already open heating channels. In fact, in the modern fabrication, in order to obtain such bores, it is necessary to work with deep-hole drilling tools and corresponding drilling machines, whereby the drillings have to be removed from the cutting zone with considerable amounts of a lubrication medium.

When, during the boring of a collecting or return channel, the drill passes through an already-drilled heating channel, the lubrication medium can be discharged and the drill can have a dry run until it is destroyed and/or can be deflected. The circumstances are similar when the collecting or return channels are drilled first. Besides, it requires extraordinary efforts to insert the deflecting elements in the return channels made by this method.

OBJECT OF THE INVENTION

It is the object of the invention to provide an improved method of making a platen having the heating and other channels and free of the aforedescribed drawback so that the various bores can be easily made, without the danger that the drilling process will be disturbed because the drill has to pass through an already-made open bore. At the same time, the insertion of the deflecting components should be facilitated. It is selfunderstood that preferably deep-hole drilling tools and corresponding drilling machines are to be used for this operation, and that with a single machine, without interruption of the fabrication process, the heating channels as well as the collecting or return channels must be made.

SUMMARY OF THE INVENTION

The invention provides that the return channels or the collecting channels be drilled first.

Into the return channels or collecting channels prefitted cores are then inserted.

Thereafter the heating channels are drilled, thereby perforating the cores inserted in the return or collecting channels.

Then the drilled cores are extracted and, outside the steel plate, the cores assigned to the return channels are equipped with deflecting shaped parts, as well as optionally with plugs.

Finally the cores equipped with the shaped elements or plugs are reinserted in the respective return channels. The invention is based on the finding that a drill, particularly a deep-hole drill is not deflected when drilling through an open bore of the same or a larger diameter, if the bore is not open, but filled by a fitted core, which is held nonrotatable during the drilling process.

Such cores can also be inserted as deflecting components; they can be easily equipped with the corresponding deflecting shaped parts and introduced in the respective return channels. It is thereby within the framework of the invention to rotate the cores by 90° during their reinsertion into the respective return channels, and to insert deflecting elements and optionally the plugs before that by taking into consideration this rotation.

It is also within the framework of the invention to insert, in addition to the cores which have been drilled through during the drilling of the heating channels, also cores simply equipped with deflecting elements and some additional bores running in the direction of the heating channels into the return or collecting channels.

The cores according to the invention, which have been drilled through during the drilling of the heating channels have a certain structure formed by this drilling procedure, attuned to the heating channels, which can be used in order to create the deflecting elements in a simple way.

A preferred embodiment of the invention, which possesses its own independent important, is characterized by the fact that the deflecting elements use the bores produced in the respective cores during the drilling of the heating channels, so that these bores become component parts of the deflecting elements.

Generally, a press platen has collecting or return channels on two opposite sides. It is within the framework of the invention to drill incompletely, namely only halfway through a core facing away from the drilling machine, while the core is in a return channel.

When the wall between such halfway bores is removed, deflecting chambers are obtained in a simple manner.

An advantage of the invention is that various types of bores can be easily produced, without the danger that a drilling process will be disturbed by the fact that the drill has to run through an already drilled bore. At the same time, the insertion of the deflecting components is considerably facilitated. As a result, a press platen produced according to the process of the invention is distinguished by its construction.

The deflecting components of the platen thus are cores which have been inserted in the previously drilled return or collecting channels and have been provided with the bores or halfway bores corresponding to the heating channels, during the drilling of these heating channels. The deflecting elements are created by using the bores or halfway bores produced during the drilling of the heating channels.

BRIEF DESCRIPTION OF THE DRAWING

The above and other objects, features and advantages of the present invention will become more readily apparent from the following description, reference being made to the accompanying drawing in which:

FIG. 1 is a horizontal section through a press platen in the form of a steel plate, wherein various process steps have already been performed;

FIG. 2 is a section taken along the line A—A of FIG. 1;

FIG. 3 is a view corresponding to FIG. 1 showing a detail of a press platen produced according to the process of the invention;

FIG. 4 is a section along the line B—B of FIG. 3;

SPECIFIC DESCRIPTION

Figure 5:
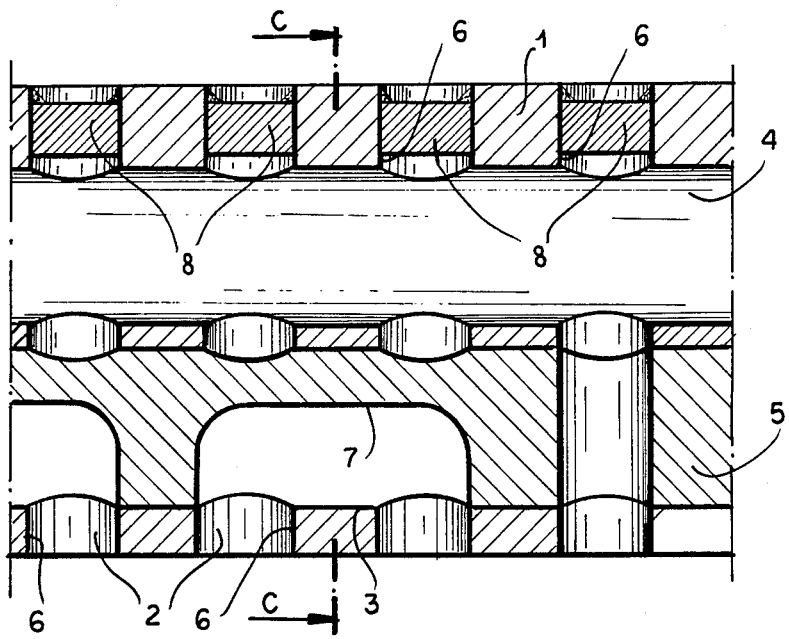
FIG. 5 is a view corresponding to FIG. 3 of another embodiment of a press platen according to the invention.
Figure 6:
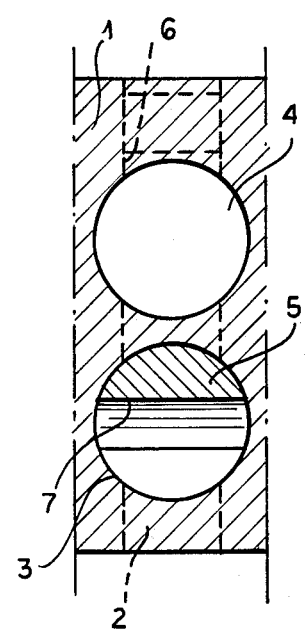
FIG. 6 is a section taken along line C—C of FIG. 5.
Figure 7:
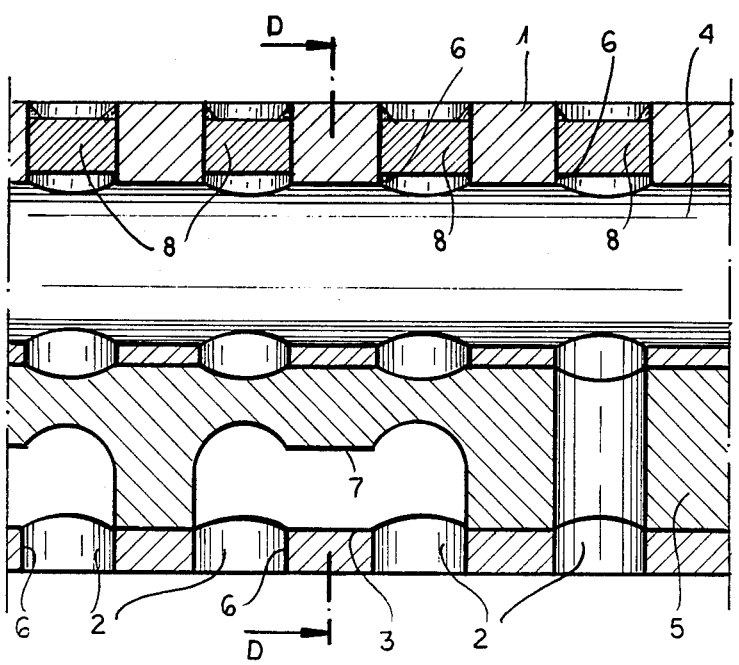
FIG. 7 is another view corresponding to FIG. 3 showing yet another embodiment of a press platen according to the invention.
Figure 8:
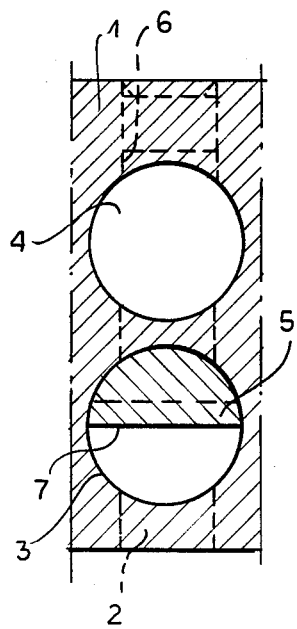
FIG. 8 is a section along line D—D of FIG. 7.

FIGS. 3 to 8 show details of the press platen 1, produced in accordance with the process of the invention, which are heatable by a fluid medium. The press platens 1 are made from a steel plate, as indicated in the details shown in FIGS. 1 and 2. The press platens 1 are used in the production of chip board, fiber board, laminated board and the like. They have a multitude of drilled heating channels 2, running parallel to each other and, transversely to the heating channels, return channels 3 and collecting channels 4, which are also drilled.

In the return channels 3, deflecting components 5 are inserted.

From a comparison of FIGS. 3 to 8, it can be seen that the deflecting components are cores, which are inserted in the previously drilled return channels 3 or collecting channels 4. During the drilling of the heating channels 2, these cores are provided with the bores 6 corresponding to the heating channels 2. In these cores 5 deflecting elements 7 are provided, which are formed by using the bores 6 produced during the drilling of the heating channels 2.

From FIGS. 1 and 2 it can be seen that in the production of such press platens, the return channels 3 and the collecting channels 4 are drilled first.

After that, cores 5 are inserted into the return-and-collecting channels 3, 4 and are of a predetermined size to fit as closely as possible.

In FIGS. 1 and 2, these cores 5 can be recognized.

Then the heating channels 2 are drilled. In FIG. 1, the heating channel 2 to the left has already been drilled, the other heating channel 2 is in the process of being drilled. The bore 6 in the latter case has already passed through the core 5 in the collecting channel 4. As a result, the cores 5 inserted in the return-and-collecting channels 3, 4 are drilled through.

Thereafter, the already drilled cores 5 are extracted, which is not shown in the drawing. Outside the steel plate, the cores pertaining to the return channels 3 are provided with the deflecting elements 7 which can be seen from FIGS. 3 to 8, as well as optionally with plug 8.

Subsequently, the cores 5 provided with the deflecting elements 7 and optionally with the plugs 8 are reinserted in the thereto assigned return channels 3, as can be seen from FIGS. 3 to 8. The deflecting elements 7 are always created by using the bores 6 produced in the cores 5 during the drilling of the heating channels 2 as a component of the deflectingly shaped elements 7.

For the production of the deflectingly shaped elements 7, the most varied methods of fabrication can be used, as for instance milling or erosion. Generally, a press platen 1 has the collecting-and-return channels 3 or 4 on two opposite sides.

What is claimed is:

1. A method of making a press platen adapted to be traversed by a fluid medium for a platen press used in making pressed board, said method comprising the steps of:
   (a) in a press platen forming a plurality of fluid medium channels extending parallel to one another in one direction;
   (b) thereafter inserting in said channels respective cores dimensioned to fit said channels;
   (c) then drilling bores in said platen perpendicular to said channels and through said channels and the cores received therein to provide passages communicating with said channels, while forming bores in said cores;
   (d) thereafter withdrawing said cores from said channels and, outside said platen, forming said cores with fluiddeflecting elements at least in part by the bores formed in said cores and inserting therein plugs for controlling fluid flow through said passages; and
   (e) reinserting said cores in the respective channels for control of fluid flow between said channels and said passages and between said passages.

2. The method defined in claim 1 wherein said cores, upon reinsertion in said channels, are rotated by 90° from their respective orientations in said channels during the drilling of said bores.

3. The method defined in claim 1, further comprising the step of inserting cores previously provided with deflecting elements and additional bores in respective passages of said platen for additional control of fluid paths therein.

4. The method defined in claim 1 wherein at least some of the bores formed in said cores and utilized as part of said deflecting elements are drilled only part way through the respective cores.

* * * * *